(12) United States Patent
Yamamoto

(10) Patent No.: US 11,009,488 B2
(45) Date of Patent: May 18, 2021

(54) FLUID CHROMATOGRAPH

(71) Applicant: Shimadzu Corporation, Kyoto (JP)

(72) Inventor: Shintaro Yamamoto, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 98 days.

(21) Appl. No.: 16/348,845

(22) PCT Filed: Dec. 8, 2016

(86) PCT No.: PCT/JP2016/086474
§ 371 (c)(1),
(2) Date: May 9, 2019

(87) PCT Pub. No.: WO2018/105076
PCT Pub. Date: Jun. 14, 2018

(65) Prior Publication Data
US 2019/0285592 A1    Sep. 19, 2019

(51) Int. Cl.
*G01N 30/20* (2006.01)
*G01N 30/02* (2006.01)

(52) U.S. Cl.
CPC ............ *G01N 30/20* (2013.01); *G01N 30/02* (2013.01); *G01N 2030/027* (2013.01); *G01N 2030/201* (2013.01)

(58) Field of Classification Search
CPC ............ G01N 30/20; G01N 2030/201; G01N 2030/027
See application file for complete search history.

(56) References Cited

U.S. PATENT DOCUMENTS

2009/0000358 A1*  1/2009  Kerkdijk ............... G01N 30/461
                                              73/61.55
2010/0187177 A1*  7/2010  Dehmer ................. G01N 30/20
                                              210/659
(Continued)

FOREIGN PATENT DOCUMENTS

JP    2012-163334 A    8/2012
JP    2014-106213 A    6/2014

OTHER PUBLICATIONS

Notice of Reasons for Refusal for Japanese Patent Application No. JP 2018-555395, dated Nov. 6, 2019.
(Continued)

*Primary Examiner* — Paul M. West
*Assistant Examiner* — Mark A Shabman
(74) *Attorney, Agent, or Firm* — Muir Patent Law, PLLC

(57) ABSTRACT

A fluid chromatograph includes a flow path switching part configured to switch to one of states including a sampling state in which the measuring pump is connected to a proximal end side of the sampling flow path, a total volume introduction state in which the mobile phase sending part is connected to a proximal end side of the sampling flow path and the needle port and the analysis flow path are connected to each other, an injection state in which the measuring pump is connected to the proximal end side of the sampling flow path and the needle port and the second sample loop are connected to each other, and a loop introduction state in which the mobile phase sending part is connected to one end side of the sample loop and the analysis flow path is connected to the other end side of the sample loop.

4 Claims, 6 Drawing Sheets

(56) References Cited

U.S. PATENT DOCUMENTS

| | | | |
|---|---|---|---|
| 2012/0024048 A1* | 2/2012 | Maeda | G01N 30/20 |
| | | | 73/61.55 |
| 2012/0103074 A1* | 5/2012 | Likuski | G01N 30/24 |
| | | | 73/61.55 |
| 2012/0240666 A1* | 9/2012 | Sims | G01N 30/32 |
| | | | 73/61.56 |
| 2016/0054274 A1 | 2/2016 | Cormier et al. | |
| 2016/0202218 A1 | 7/2016 | Owa | |

OTHER PUBLICATIONS

First Office Action dated Sep. 29, 2020 for the Chinese Patent Application No. 201680089948.6 from the Chinese Patent Office.
First Examination Report from the Indian Patent Office dated Feb. 8, 2021 for the corresponding Indian Patent Application No. 201947024239.

* cited by examiner

FLUID CHROMATOGRAPH

TECHNICAL FIELD

The present invention relates to a fluid chromatograph such as a liquid chromatograph (hereinafter referred to as an LC) or a supercritical fluid chromatograph (hereinafter referred to as an SFC).

BACKGROUND ART

In an LC, a sample is usually collected from a container containing the sample using a needle, and the collected sample is injected into a flow path of a mobile phase and introduced into an analytical column. Methods of injecting a sample collected with a needle into an analytical column include a total volume injection method (for example, refer to FIG. 1 in Patent Document 1) for introducing all samples collected with a needle into an analytical column and a loop injection method of introducing only a predetermined amount of sample of the sample collected with a needle into an analytical column.

The total volume injection method and the loop injection method respectively have their advantages and disadvantages. For example, in the total volume injection method, because a sampling flow path including a needle is incorporated in a flow path system in which a mobile phase flows, the method has an advantage of being able to introduce the whole sample collected with the needle into the analytical column but has a disadvantage of increasing the internal volume of the flow path system at the time of analysis and increasing the gradient delay volume at the time of gradient liquid sending. In contrast to this, in the loop injection method, because the sampling flow path is not incorporated in the flow path system through which a mobile phase flows, the volume of the flow path system at the time of analysis is smaller than that of the total volume injection method. Accordingly, the loop injection method has an advantage that the gradient delay volume at the time of gradient feeding is smaller than that in the total volume injection method and an advantage that the time required for the replacement of a solvent in the flow path system from the end of an analysis until the start of the next analysis is shorter than that in the total volume injection method.

PRIOR ART DOCUMENT

Patent Document

Patent Document 1: Japanese Patent Laid-open Publication No. 2012-163334

SUMMARY OF THE INVENTION

Problems to be Solved by the Invention

The total volume injection method and the loop injection method differ in the configurations of the flow paths. In order to change the injection method, it is necessary for the user to change the piping configuration and the apparatus setting using a dedicated kit. Such changing operations are cumbersome to the user.

The LC can be changed to an SFC by changing the analytical column to an SFC column, installing a back pressure control mechanism (BPR) on the downstream side of the detector, and changing the mobile phase to an SFC mobile phase such as liquefied carbon dioxide. However, because the SFC uses liquid carbon dioxide as a mobile phase, liquid carbon dioxide is vaporized in the total volume injection method which opens the flow path once to the atmosphere. This makes it impossible to perform accurate suction of a sample. Accordingly, the total volume injection method cannot be adopted as a sample injection method in the SFC. Therefore, when the sample injection method of the original LC is the total volume injection method, it is not possible to change from the LC to the SFC only by, for example, changing the analytical column and installing the BRP. A large-scale change in piping for the loop injection method is necessary.

It is therefore an object of the present invention to make it possible to easily change the sample injection method between the total volume injection method and the loop injection method.

Means for Solving the Problem

A fluid chromatograph according to the present invention includes a measuring pump, a mobile phase sending part for sending a mobile phase, a sampling flow path having a needle at a distal end thereof and having a first sample loop for retaining a liquid sucked from a distal end of the needle at a proximal end side of the needle, a needle port communicating with the sampling flow path by inserting the distal end of the needle, a second sample loop provided separately from the first sample loop, an analysis flow path including an analytical column for separating a sample into individual components and a detector configured to detect the components separated by the analytical column, and a flow path switching part configured to switch to either a sampling state, a total volume introduction state, an injection state, or a loop introduction state. In the sampling state, the measuring pump is connected to a proximal end side of the sampling flow path. In the total volume introduction state, the mobile phase sending part is connected to the proximal end side of the sampling flow path and the needle port and the analysis flow path are connected to each other. In the injection state, the measuring pump is connected to the proximal end side of the sampling flow path and the needle port and the second sample loop are connected to each other. In the loop introduction state, the mobile phase sending part is connected to one end side of the second sample loop and the analysis flow path is connected to the other end side of the second sample loop.

In a preferred embodiment of the fluid chromatograph according to the present invention, the flow path switching part includes at least a first multi-port valve and a second multi-port valve, each having a plurality of connection ports and configured to switch connection between the connection ports. In this case, the first multi-port valve includes connection ports to which the needle port, the mobile phase sending part, one end of the second sample loop, the other end of the second sample loop, and a connecting flow path connected to one connection port of the second multi-port valve are respectively connected. The first multi-port valve is configured to switch between a first state and a second state. In the first state of the first multi-port valve, one end of the second sample loop and the needle port are connected to each other and the mobile phase sending part and the connecting flow path are connected to each other. In the second state of the first multi-port valve, one end of the sample loop and the mobile phase sending part are connected to each other and the other end of the sample loop and the bypass flow path are connected to each other. The second multi-port valve includes connection ports to which the measuring pump, the sampling flow path, the analysis flow path, and the connecting flow path are respectively connected. The second multi-port valve is configured to switch between a first state and a second state. In the first state of the second multi-port valve, the measuring pump and the sampling flow path are connected to each other and the analysis flow path and the connecting flow path are connected to each other. In the second state of the second multi-port valve, the sampling flow path and the connecting flow path are connected to each other.

In a more preferred embodiment, the fluid chromatograph further includes a needle driving mechanism configured to drive the needle and a control part configured to control operations of at least the measuring pump, the flow path switching part, and the needle driving mechanism.

In the above case, the control part includes an injection mode selection part configured to make a user select one of a total volume injection mode and a loop injection mode, a total volume injection operation part configured to execute a total volume injection operation of setting the flow path switching part in the sampling state, upon selection of the total volume injection mode, to suck a sample to be analyzed through the needle, and then inserting the distal end of the needle into the injection port and switching the flow path switching part to the total volume introduction state to introduce a sample into the analysis flow path by using a mobile phase from the mobile phase sending part, and a loop injection operation part configured to execute a loop injection operation of setting the flow path switching part in the sampling state, upon selection of the loop injection mode, to suck a sample to be analyzed through the needle, and then inserting the distal end of the needle into the injection port and switching the flow path switching part to the inflow state, injecting the sucked sample into the second sample loop, and then switching the flow path switching part to the loop introduction state to introduce a sample into the analysis flow path by using a mobile phase from the mobile phase sending part.

Because the control part is configured in the above manner, when the user simply selects the total volume injection mode or the loop injection mode, the apparatus automatically operates in either the total volume injection method or the loop injection method selected by the user. This facilitates the operation by the user.

The fluid chromatograph according to the present invention may be an LC or SFC or may be configured to be switched to each of the LC and SFC modes.

When the fluid chromatograph according to the present invention is configured to be switched to each of the LC and SFC modes, the mobile phase sending part includes a liquid sending pump configured to send an LC mobile phase and a liquid sending pump configured to send an SFC mobile phase, and the analysis flow path includes a back pressure control mechanism configured to control a pressure in the analysis flow path on an outlet side of the detector. The control part is configured to also control operations of the mobile phase sending part and the back pressure control mechanism, and further includes an analysis mode selection part configured to make a user select one of modes including a liquid chromatograph mode (to be referred to as an LC mode hereinafter) and a supercritical fluid chromatograph mode (to be referred to as an SFC mode hereinafter)

In this case, as described above, because the SFC uses liquid carbon dioxide as a mobile phase, liquid carbon dioxide is vaporized in the total volume injection method which opens the flow path once to the atmosphere. This makes it impossible to perform accurate suction of a sample.

Accordingly, the total volume injection method cannot be adopted as an injection method in the SFC. Therefore, according to the present invention, it is preferable that the loop injection mode is always selected when the SFC mode is selected by the user. With this arrangement, it is possible to prevent the total volume injection mode from being erroneously selected despite the fact that the SFC mode is selected.

Methods of selecting the loop injection mode when the supercritical fluid chromatograph mode is selected include, for example, a method of automatically selecting the loop injection mode when the supercritical fluid chromatograph mode is selected, a method of selecting only the loop injection mode when the supercritical fluid chromatograph is selected, and a method of issuing an error when the total volume injection mode is selected despite the election of the supercritical fluid chromatograph mode.

Effect of the Invention

The fluid chromatograph according to the present invention includes the flow path switching part configured to switch to one of states including the sampling state in which the measuring pump is connected to the proximal end side of the sampling flow path, the total volume introduction state in which the mobile phase sending part is connected to the proximal end side of the sampling flow path, the injection state in which the measuring pump is connected to the proximal end side of the sampling flow path and the needle port and the second sample loop are connected to each other, and the loop introduction state in which the mobile phase sending part is connected to one end side of the sample loop and the analysis flow path is connected to the other end side of the sample loop. This makes it possible to switch the sample injection method to be used between the total volume injection method and the loop injection method without rearranging piping.

EMBODIMENT OF THE INVENTION

Figure 1:
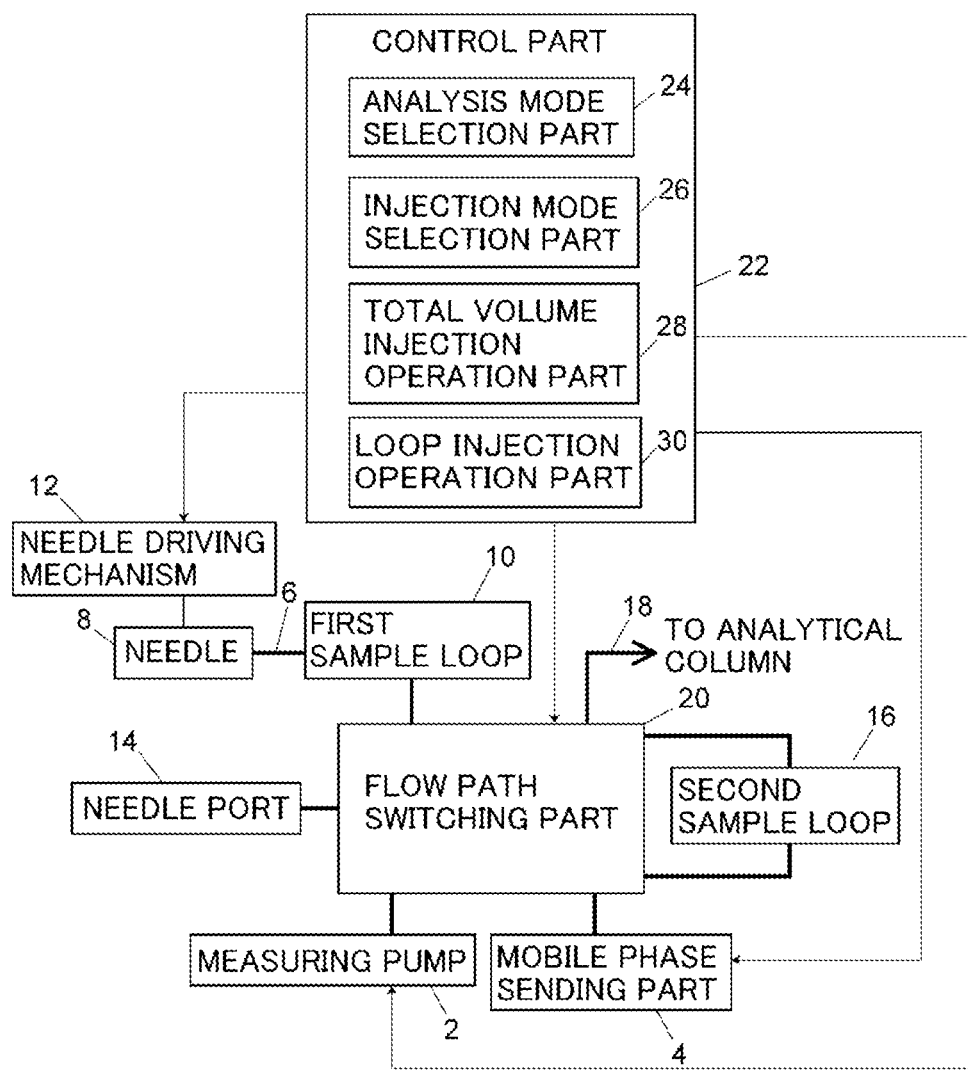
FIG. 1 is a block diagram schematically showing an embodiment of a fluid chromatograph.

One embodiment of a fluid chromatograph according to the present invention will be described below with reference to the accompanying drawings.

The schematic configuration of the fluid chromatograph will be described with reference to the block diagram of FIG. 1.

The fluid chromatograph according to this embodiment mainly includes a measuring pump 2, a mobile phase sending part 4, a sampling flow path 6, a needle port 14, a second sample loop 16, an analysis flow path 18, a flow path switching part 20, and a control part 22.

The mobile phase sending part 4 is provided with a pump for sending an LC or SFC mobile phase. As will be described later, this fluid chromatograph can operate in the LC mode and the SFC mode. As shown in FIGS. 2 to 6, the mobile phase sending part 4 is configured to select either the LC mode or the SFC mode and configured to be able to send both an LC mobile phase and an SFC mobile phase. The mobile phase sending part 4 sends an LC mobile phase in the LC mode and sends an SFC mobile phase in the SFC mode.

The sampling flow path 6 has a sampling needle 8 at its distal end and a first sample loop 10 at the proximal end side of the needle 8. The first sample loop 10 retains the liquid sucked through the needle 8. The needle 8 is driven by the needle driving mechanism 12. The driving directions of the needle 8 include, for example, a horizontal plane direction and a vertical direction.

The needle port 14 communicates with the sampling flow path 6 by inserting the distal end of the needle 8.

The second sample loop 16 is provided separately from the first sample loop 10 of the sampling flow channel 6 and is used to temporarily retain the sample injected through the needle 14.

Although not shown in FIG. 1, the analysis flow path 18 includes an analytical column configured to separate a sample into individual components, a detector for detecting the sample components separated by the analytical column, and a back pressure control mechanism (hereinafter referred to as BPR) for controlling the pressure in the analysis flow path 18. When the LC mode is selected, the BPR of the analysis flow path 18 is unnecessary and does not operate. In contrast to this, when the SFC mode is selected, the BPR of the analysis flow path 18 operates to set the pressure in the analysis flow path 18 to a predetermined pressure. The predetermined pressure is a pressure at which the mobile phase flowing through the analysis channel 18 is maintained in the supercritical state.

The flow path switching part 20 is used to change the flow path configuration incorporating the measuring pump 2, the mobile phase sending part 4, the sampling flow path 6, the needle port 14, the second sample loop 16, and the analysis flow path 18. The flow path switching part 20 can switch to one of at least four states.

The four states to which the flow path switching part is switched include a suction state in which the measuring pump 2 and the sampling flow path 6 are connected, a total volume introduction state in which the mobile phase sending part 4 and the sampling flow path 6 are connected and the needle port 14 and the second sample loop 16 are connected, an injection state in which the measuring pump 2 and the sampling flow path 6 are connected and the needle port 14 and the second sample loop 16 are connected, and a loop introduction state in which the mobile phase sending part 4 and one end of the second sample loop 16 are connected and the other end of the second sample loop 16 and the analysis flow path 18 are connected. The flow path configuration in each state will be described later with reference to FIGS. 3 to 6.

The control part 22 controls operations of the measuring pump 2, the mobile phase sending part 4, the needle driving mechanism 12, and the flow path switching part 20. The control part 22 is provided with an analysis mode selection part 24, an injection mode selection part 26, a total volume injection operation part 28, and a loop injection operation part 30.

The analysis mode selection part 24 is configured to make the user select either the LC mode or the SFC mode as an analysis mode. When the LC mode is selected, an LC mobile phase is sent from the mobile phase sending part 4, and the BPR of the analysis flow path 18 is stopped, thereby forming this fluid chromatograph as an LC. In contrast to this, when the SFC mode is selected, an SFC mobile phase is sent from the mobile phase sending part 4, and the BPR of the analysis flow path 18 is operated to adjust the pressure inside the analysis flow path 18 to a predetermined pressure, thereby forming this fluid chromatograph as an SFC.

The injection mode selection part 26 is configured to make the user select either the total volume injection mode or the loop injection mode as an injection mode.

The total volume injection operation part 28 is configured to control the operations of the measuring pump 2, the mobile phase feeding part 4, the needle driving mechanism 12, and the flow path switching part 20 so as to execute a total volume injection operation when the total volume injection mode is selected. The total volume injection operation is an operation in which after the flow path switching part 20 is set in the injection state and a sample is sucked through the needle 8 and retained in the first sample loop 10, the distal end of the needle 8 is inserted into the needle port 14, and the switching part 20 is switched to the total volume introduction mode to guide the whole sample retained in the first sample loop 10 to the analysis flow path 18 by using a mobile phase from the mobile phase sending part.

The loop injection operation part 30 is configured to control the operations of the measuring pump 2, the mobile phase feeding part 4, the needle driving mechanism 12, and the flow path switching part 20 so as to execute a loop injection operation when the loop injection mode is selected. The loop injection operation is an operation in which after the flow path switching part 20 is set in the injection state and a sample is sucked through the needle 8 and retained in the first sample loop 10, the distal end of the needle 8 is inserted into the needle port 14, the flow path switching part 20 is switched to the injection state to inject a predetermined amount of sample of the sample retained in the first sample loop 10 into the second sample loop 16 through the needle port 14, and then flow path switching part 20 is switched to the loop introduction state to guide the sample retained in the second sample loop 16 to the analysis flow path 18 by using a mobile phase from the mobile phase sending part 4.

When the SFC mode is selected as an analysis mode, the loop injection mode is always selected as an injection mode. In order to "always select the loop injection mode", the loop injection mode may be automatically selected when the SFC mode is selected regardless of user's selection, or an error may be issued when the total volume injection mode is selected in spite of the selection of the SFC mode, or the selection of the total volume injection mode may be inhibited when the SFC mode is selected.

Figure 2:
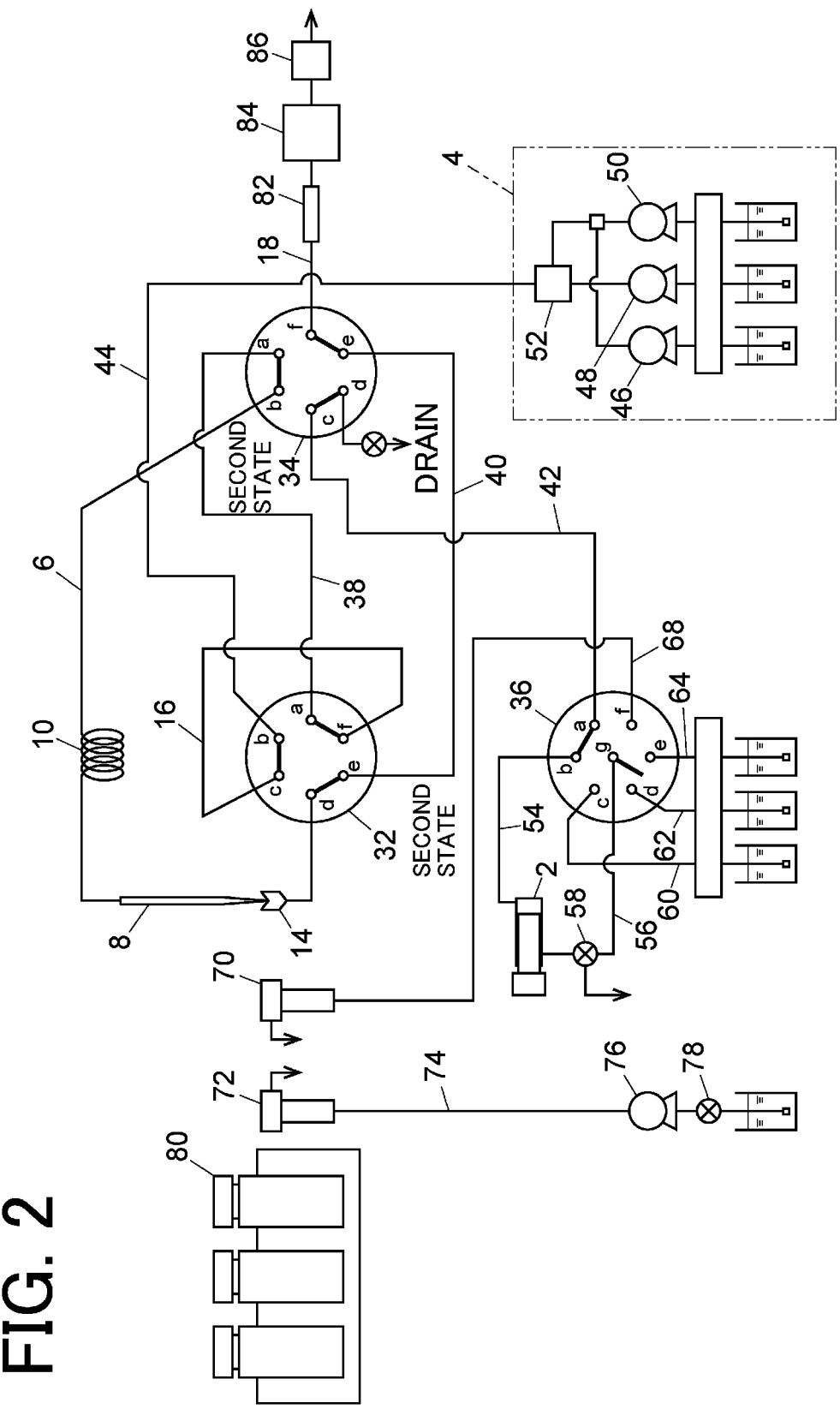
FIG. 2 is a schematic flow path configuration diagram showing a flow path configuration according to the same embodiment.

One embodiment of the detailed flow path configuration of the above fluid chromatograph will be described next with reference to FIG. 2.

In this embodiment, the flow path switching part 20 in FIG. 1 includes three switching valves including a switching valve 32 (first multi-port valve), a switching valve 34 (second multi-port valve), and a switching valve 36. Each of the switching valves 32 and 34 is a 6-port valve having six connection ports a to f arranged evenly and counterclockwise on the same circumference and configured to switch connection between the adjacent connection ports. The switching valve 36 is a 7-port valve having six connection ports a to f arranged evenly and counterclockwise on the same circumference and a central port g arranged at the center of the connection ports a to f.

The connection ports a of the switching valves 32 and 34 are connected to each other by a connecting flow path 38 and the connection ports e of the switching valves 32 and 34 are connected to each other by a bypass flow path 40. The connection port c of the switching valve 34 and the connection port a of the switching valve 36 are connected to each other by a pump connecting flow path 42.

Concerning the switching valve 32, a mobile phase sending flow path 44 from the mobile phase sending part 4 is connected to the connection port b, one end of the second sample loop 16 is connected to the connection port c, the needle port 14 is connected to the port d, and the other end of the second sample loop 16 is connected to the port f. The switching valve 32 can be switched to either a first state (the state of the switching valve 32 in FIG. 5) in which the connection ports a and b, c and d, and e and f communicate with each other or a second state (the state of the switching valve 32 in FIG. 2) in which the connection ports a and f, b and c, and d and e communication with each other.

Concerning the switching valve 34, the proximal end of the sampling flow path 6 is connected to the connection port b, the connection port d communicates with the drain, and the analysis flow path 18 is connected to the connection port f. The switching valve 34 can be switched to either the second state (the state of the switching valve 34 in FIG. 2) in which the connection ports a and b, c and d, and e and f communicate with each other or the first state (the state of the switching valve 34 in FIG. 3) in which the connection ports a and f, b and c, and d and e communication with each other.

Concerning the switching valve 36, a first pump flow path 54 communicating with the first suction/discharge port of the measuring pump 2 is connected to the connection port b, cleaning liquid flow paths 60, 62, and 64 communicating with the cleaning liquid container are respectively connected to the connection ports c, d and e, a cleaning flow path 68 communicating with a cleaning port 70 is connected to the connection port f, and a second pump flow path 56 communicating with the second suction/discharge port of the measuring pump 2 is connected to the central port g. A manual prime valve 58 is provided on the second pump flow path 56. The switching valve 36 can connect a pair of adjacent connection ports out of the connection ports a to f or connect the central port g to any one of the connection ports a to f.

In this embodiment, the mobile phase sending part 4 includes liquid sending pumps 46, 48 and 50 for sending three types of solvents as mobile phases. The liquid sending pumps 46 and 48 are used to send an SFC mobile phase, and the liquid sending pumps 48 and 50 are used to send an LC mobile phase. For example, the liquid sending pump 46 sends liquefied carbon dioxide, the liquid sending pump 48 sends ethanol or methanol, and the liquid sending pump 50 sends water. When the LC mode is selected as an analysis mode, an organic solvent such as ethanol or methanol and water are sent to a mixer 52 by the liquid sending pumps 48 and 50, and the mixture of them is supplied as a mobile phase through the liquid sending flow path 44. When the SFC mode is selected as an analysis mode, a modifier such as ethanol or methanol and liquefied carbon dioxide are sent to a mixer 52 by the liquid sending pumps 46 and 48, and the mixture of them is supplied as a mobile phase through the liquid sending flow path 44.

Cleaning ports 70 and 72 are provided on the movement path of the needle 8 to clean the outer and inner surfaces of the needle 8. A flow path 74 for supplying a cleaning liquid is connected to the cleaning port 72. On the flow path 74, a liquid sending pump 76 and an electromagnetic valve 78 are provided.

The analysis flow path 18 includes an analytical column 82, a detector 84, and a BPR 86 from the upstream side. As described above, the BPR 86 operates only when the SFC mode is selected as an analysis mode, and does not operate when the LC mode is selected.

The operation of sample introduction into the analysis flow path 18 in the total volume injection mode according to this embodiment and the operation of sample introduction into the analysis flow path 18 in the loop injection mode will be described with reference to FIGS. 3 to 6.

Figure 3:
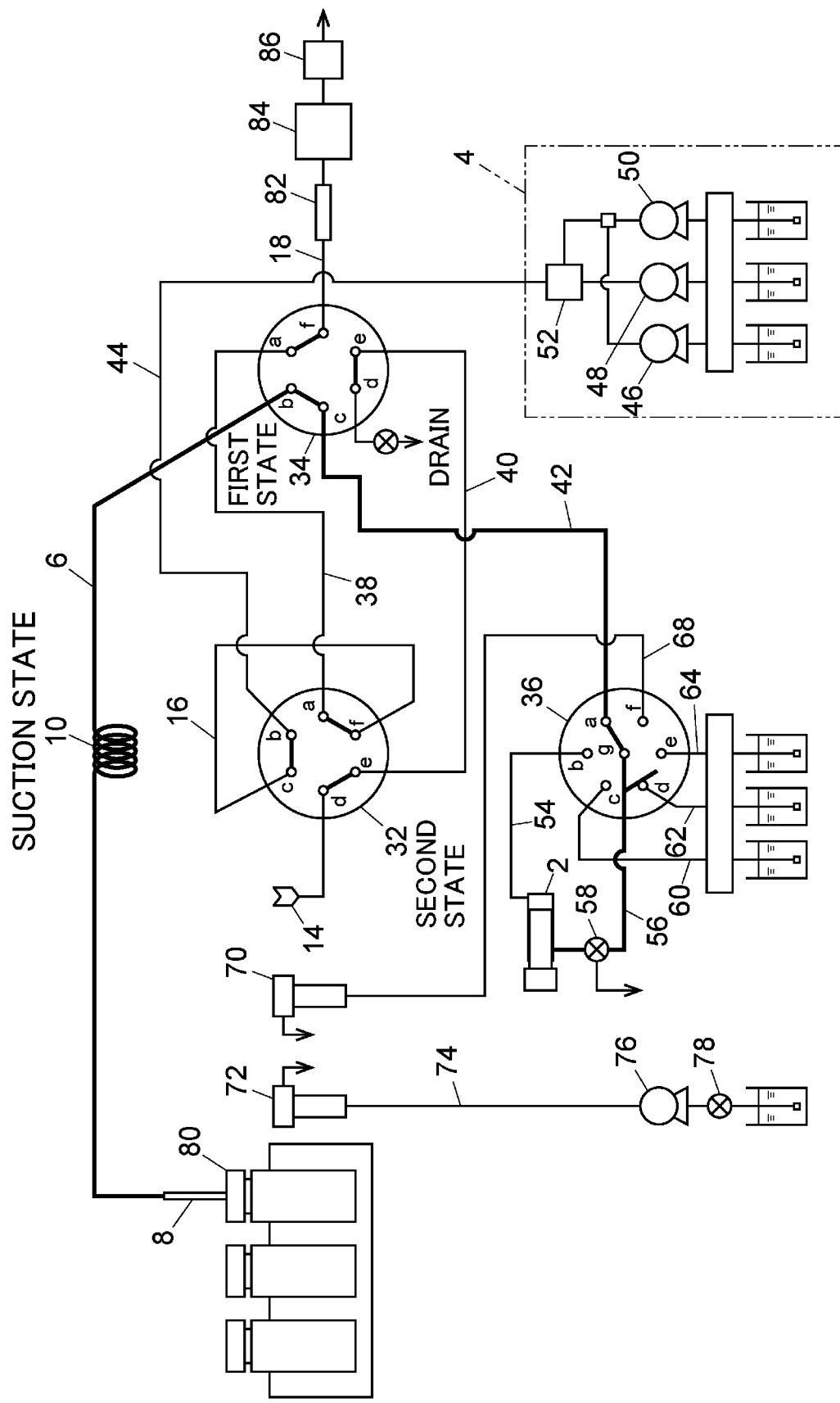
FIG. 3 is a schematic flow path configuration diagram showing a flow path configuration at the time of sample suction in the same embodiment.

First, the case in which the total volume injection mode is selected will be described. When the total volume injection mode is selected, a sample is collected from a sample container 80 containing the sample to be analyzed using the needle 8. As shown in FIG. 3, the switching valve 32 is set in the second state, the switching valve 34 is set in the first state, and the switching valve 36 is set in a state in which the ports a and g are connected. As a result, as indicated by the thick line in FIG. 3, the second suction/discharge port of the measuring pump 2 and the sampling flow path 6 communicate with each other. This state is the "suction state". In this suction state, the distal end of the needle 8 is immersed in the sample in the sample container 80, and the measuring pump 2 is driven to suck the sample from the distal end of the needle 8. The sample sucked from the distal end of the needle 8 stays in the first sample loop 10 on the proximal end side of the needle 8.

In the above-described suction state, the mobile phase sending flow path 44, the second sample loop 16, the connecting flow path 38, the analysis flow path 18 are sequentially connected, and a mobile phase from the mobile phase sending part 4 is connected to the analysis flow path 18.

Figure 4:
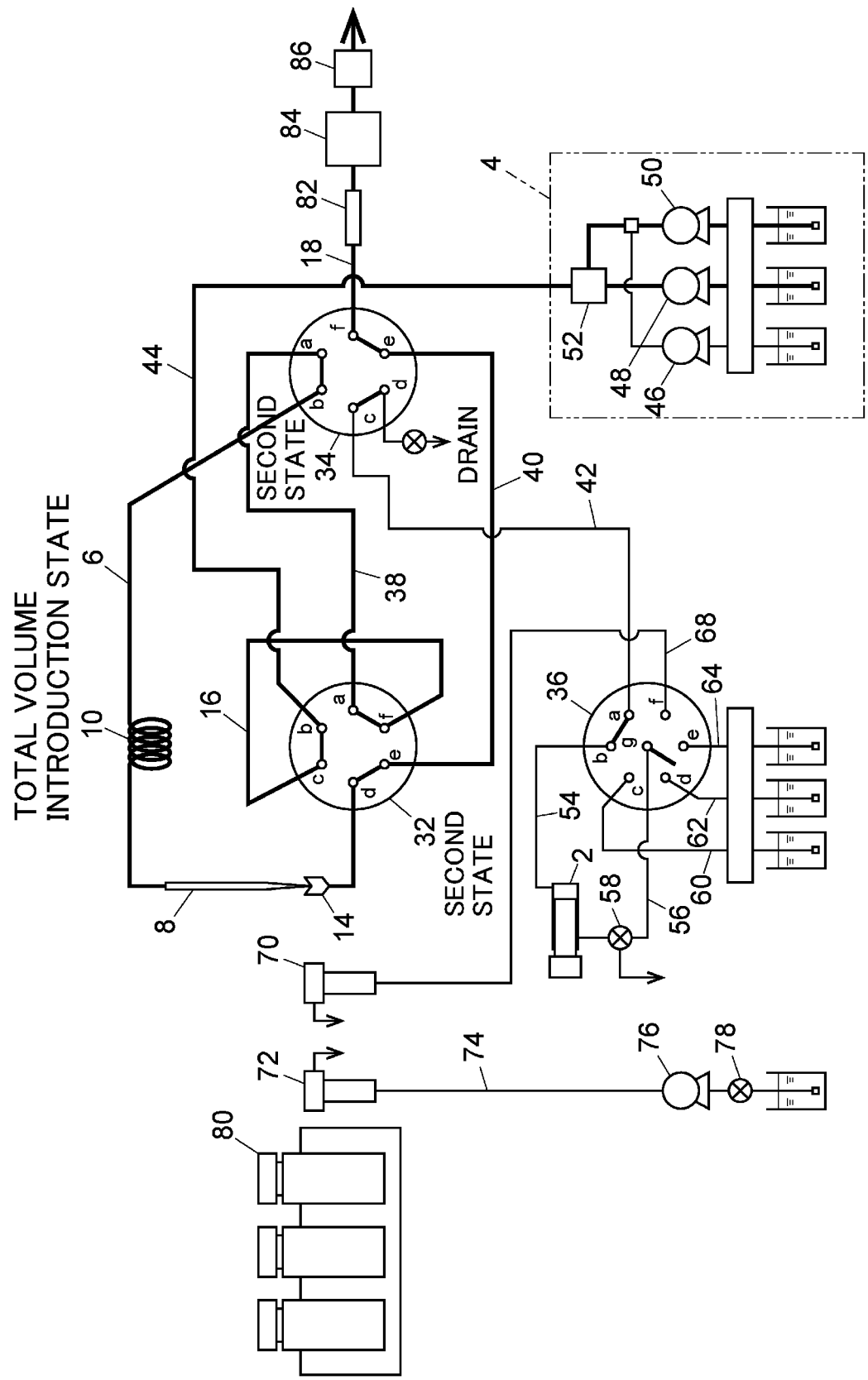
FIG. 4 is a schematic flow path configuration diagram showing a flow path configuration at the time of sample introduction in the total volume injection mode according to the same embodiment.

After completion of the above sampling operation, as shown in FIG. 4, the needle 8 is moved to connect the distal end of the needle 8 to the needle port 14, and the switching valves 32 and 34 are set in the second state. As a result, the mobile phase sending flow path 44 is connected to the sampling flow path 6 through the second sample loop 16 and the connecting flow path 38, and the sampling flow path 6 is connected to the analysis flow path 18 through the needle port 14 and the bypass flow path 40. This is the "total volume introduction state". In this total volume introduction state, the sample retained in the first sample loop 10 is transferred to the analysis flow path 18 by the mobile phase from the mobile phase supply section 4, and separated into individual components by the analytical column 82. Each component is detected by the detector 84.

The case in which the loop injection mode is selected will be described next. Even when the loop injection mode is selected, the first sampling operation is the same as the total volume injection operation, and a sample is collected from the sample container 80 in the "suction state" in FIG. 3 to stay in the first sample loop 10.

Figure 5:
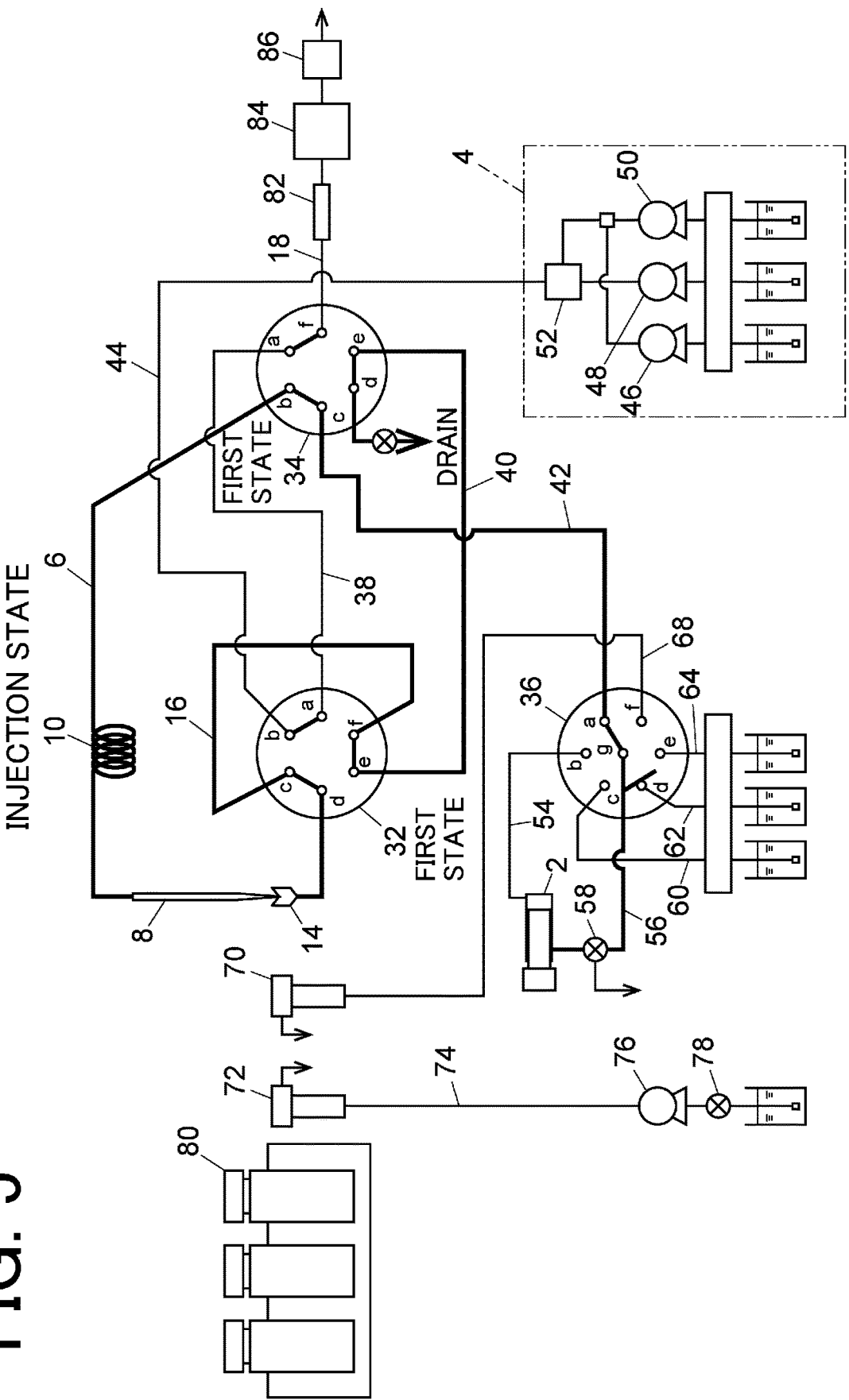
FIG. 5 is a schematic flow path configuration diagram showing a flow path configuration at the time of sample injection in the loop injection mode according to the same embodiment.

After completion of the sampling operation, as shown in FIG. 5, the needle 8 is moved to connect the distal end of the needle 8 to the needle port 14, and the switching valves 32 and 34 are both set in the first state. The switching valve 36 is set in a state in which the ports a and g are connected. As a result, the second suction/discharge port of the measuring pump 2 is connected to the sampling flow path 6, and the sampling flow path 6 is connected to the drain through the needle port 14, the second sample loop 16, and the bypass flow path 40. This state is the "injection state". A predetermined amount of sample is injected into the second sample loop 16 by driving the measuring pump 2 to discharge the sample in this injection state.

Figure 6:
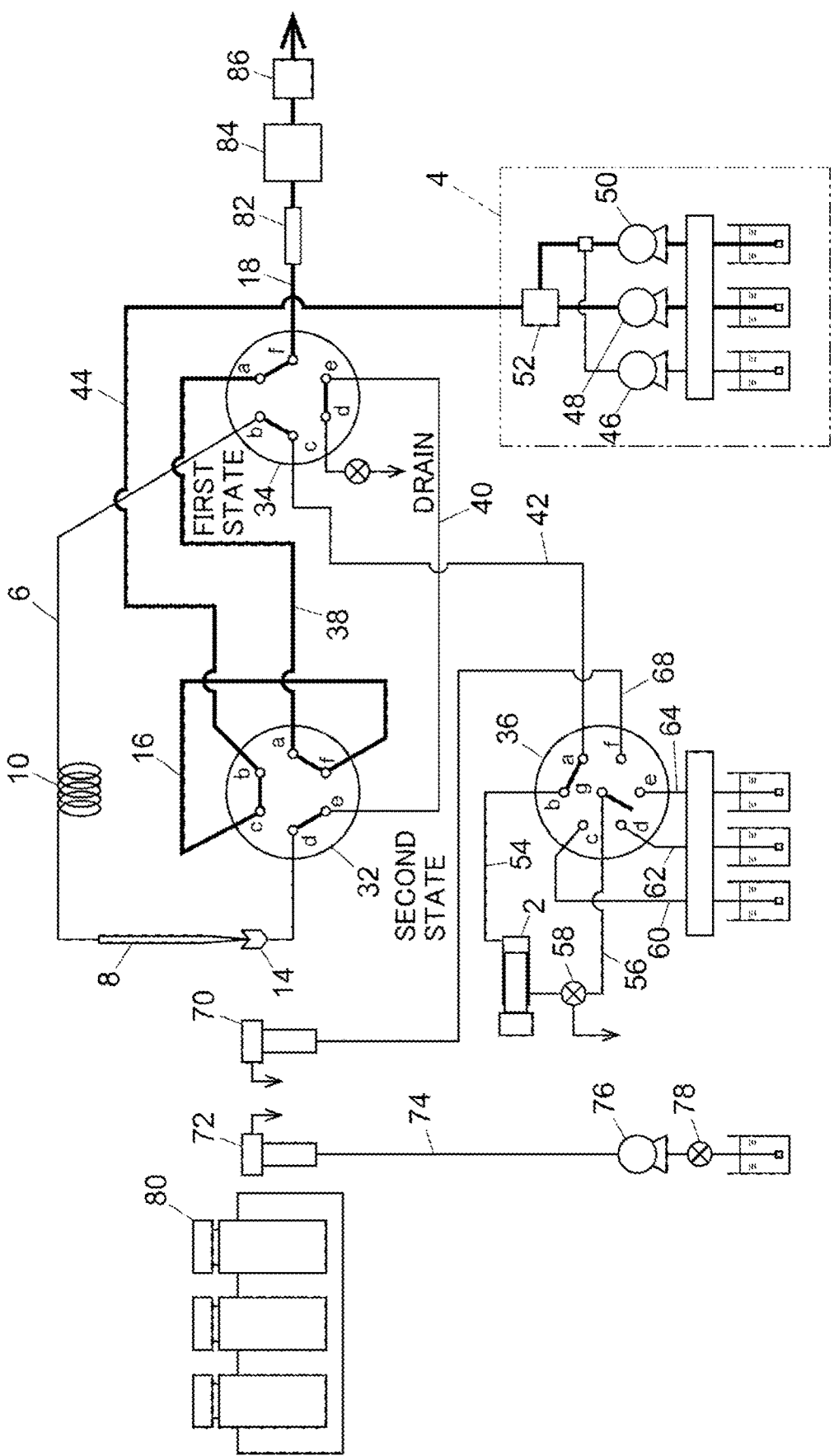
FIG. 6 is a schematic flow path configuration diagram showing a flow path configuration at the time of sample introduction in the loop injection mode according to the same embodiment.

After the injection of the sample into the second sample loop 16 is completed, as shown in FIG. 6, the switching valve 32 is set in the second state and the switching valve 34 is set in the first state. As a result, the mobile phase sending flow path 44 is connected to the analysis flow path 18 through the second sample loop 16 and the connecting flow path 38. This state is a "loop introduction state". In this loop introduction state, the sample in the second sample loop 16 is transferred to the analysis flow path 18 by the mobile phase from the mobile phase supply section 4, and separated into individual components by the analytical column 82. Each component is detected by the detector 84.

In the above-described loop introduction state, by connecting between the ports a and b of the switching valve 36 and driving the measuring pump 2 to perform a discharge operation, the liquid remaining in the system from the measuring pump 2 to the needle 8 can be discharged to the drain.

In the above embodiment, the switching valves 32 and 34, which are 6-port valves, are exemplified as multi-port valves constituting the flow path switching part 20 (see FIG. 1). However, the present invention is not limited to this, and any arrangement that has the same function as that of the flow path switching valve 20 can be used. For example, the switching valves 32 and 34 may be multi-port valves other than 6-port valves, such as 8-port valves, or may be multi-port valves having more ports (for example, 4-port valves).

In the above embodiment, as a fluid chromatograph, a fluid chromatograph capable of switching to either the LC mode or the SFC mode has been exemplified. However, the present invention is not limited to this, and a fluid chromatograph having only the LC function may be provided.

DESCRIPTION OF REFERENCE SIGNS

2: measuring pump
4: mobile phase sending part
6: sampling flow path
8: needle
10: first sample loop
12: needle driving mechanism
14: needle port
16: second sample loop
18: analysis flow path
20: flow path switching part
22: control part
24: analysis mode selection part
26: injection mode selection part
28: total volume injection operation part
30: loop injection operation part
32: switching valve (first multi-port valve)
34: switching valve (second multi-port valve)
36: switching valve
38: connecting flow path
40: bypass flow path
42: pump connecting flow path
44: mobile phase sending flow path
46 to 50, 76: liquid sending pump
80: sample container
82: analytical column
84: detector
86: back pressure control mechanism (BPR)

The invention claimed is:

1. A fluid chromatograph comprising:
a measuring pump;
a mobile phase sending part for sending a mobile phase;
a sampling flow path having a needle at a distal end thereof and having a first sample loop, the sample loop configured to retain a liquid sucked from a distal end of the needle that is received from a proximal end of the needle;
a needle port communicating with the sampling flow path by inserting the distal end of the needle;
a second sample loop provided separately from the first sample loop;
an analysis flow path including an analytical column for separating a sample into individual components and a detector for detecting the components separated by the analytical column; and
a flow path switching part configured to switch to either a sampling state, a total volume introduction state, an injection state, or a loop introduction state, wherein, in the sampling state, the measuring pump is connected to a proximal end side of the sampling flow path, in the total volume introduction state, the mobile phase sending part is connected to the proximal end side of the sampling flow path and the needle port and the analysis flow path are connected to each other, in the injection state, the measuring pump is connected to the proximal end side of the sampling flow path and the needle port and the second sample loop are connected to each other, in the loop introduction state, the mobile phase sending part is connected to one end side of the second sample loop and the analysis flow path is connected to the other end side of the second sample loop.

2. The fluid chromatograph according to claim 1, wherein the flow path switching part includes at least a first multi-port valve and a second multi-port valve, each having a plurality of connection ports and configured to switch connection between the connection ports,
the first multi-port valve includes connection ports to which the needle port, the mobile phase sending part, one end of the second sample loop, the other end of the second sample loop, and a connecting flow path connected to one connection port of the second multi-port valve are respectively connected, the first multi-port valve is configured to switch between a first state and a second state, in the first state, one end of the second sample loop and the needle port are connected to each other and the mobile phase sending part and the connecting flow path are connected to each other, in the second state, one end of the sample loop and the mobile phase sending part are connected to each other and the other end of the sample loop and the bypass flow path are connected to each other, and
the second multi-port valve includes connection ports to which the measuring pump, the sampling flow path, the analysis flow path, and the connecting flow path are respectively connected, the second multi-port valve is configured to switch between a first state and a second state, in the first state, the measuring pump and the sampling flow path are connected to each other and the analysis flow path and the connecting flow path are connected to each other, in the second state, the sampling flow path and the connecting flow path are connected to each other.

3. The fluid chromatograph according to claim 1, further comprising:
- a needle driving mechanism configured to drive the needle; and
- a control part configured to control operations of at least the measuring pump, the flow path switching part, and the needle driving mechanism,
- wherein the control part comprises:
- an injection mode selection part configured to prompt a user for an input to select one of a total volume injection mode and a loop injection mode,
- a total volume injection operation part configured to execute a total volume injection operation of setting the flow path switching part in the sampling state, upon selection of the total volume injection mode, to suck a sample to be analyzed through the needle, and then inserting the distal end of the needle into the injection port and switching the flow path switching part to the total volume introduction state to introduce a sample into the analysis flow path by using a mobile phase from the mobile phase sending part, and
- a loop injection operation part configured to execute a loop injection operation of setting the flow path switching part in the sampling state, upon selection of the loop injection mode, to suck a sample to be analyzed through the needle, and then inserting the distal end of the needle into the injection port and switching the flow path switching part to the inflow state, injecting the sucked sample into the second sample loop, and then switching the flow path switching part to the loop introduction state to introduce a sample into the analysis flow path by using a mobile phase from the mobile phase sending part.

4. The fluid chromatograph according to claim 3, wherein the mobile phase sending part includes a liquid sending pump configured to send a liquid chromatograph mobile phase and a liquid sending pump configured to send a supercritical fluid chromatograph mobile phase,
- the analysis flow path includes a back pressure control mechanism configured to control a pressure in the analysis flow path on an outlet side of the detector, and
- the control part is configured to also control operations of the mobile phase sending part and the back pressure control mechanism, further includes an analysis mode selection part configured to make a user select one of modes including a liquid chromatograph mode and a supercritical fluid chromatograph mode, and is configured to select the loop injection mode when the supercritical fluid chromatograph mode is selected.

* * * * *